United States Patent
Gafsi et al.

(10) Patent No.: US 6,990,271 B2
(45) Date of Patent: Jan. 24, 2006

(54) MULTI-BANDWIDTH COLLIMATOR

(75) Inventors: Rachid Gafsi, Corning, NY (US); Larry G Mann, Painted Post, NY (US); Nagaraja Shashidhar, Painted Post, NY (US)

(73) Assignee: Corning Incorporated, Corning, NY (US)

(*) Notice: Subject to any disclaimer, the term of this patent is extended or adjusted under 35 U.S.C. 154(b) by 57 days.

(21) Appl. No.: 10/832,592

(22) Filed: Apr. 26, 2004

(65) Prior Publication Data

US 2004/0240786 A1 Dec. 2, 2004

Related U.S. Application Data

(60) Provisional application No. 60/465,830, filed on Apr. 25, 2003.

(51) Int. Cl.
*G02B 6/32* (2006.01)
*G02B 27/30* (2006.01)
*G02B 7/02* (2006.01)

(52) U.S. Cl. .......................... 385/34; 359/641; 359/652
(58) Field of Classification Search ................. 385/34; 359/641, 652–654
See application file for complete search history.

(56) References Cited

U.S. PATENT DOCUMENTS

| | | | | |
|---|---|---|---|---|
| 4,641,927 A | * | 2/1987 | Prescott et al. | 359/654 |
| 5,841,586 A | | 11/1998 | Nagaoka | 359/654 |
| 6,717,733 B2 | * | 4/2004 | Sato et al. | 359/619 |
| 2003/0118305 A1 | * | 6/2003 | Reed et al. | 385/124 |
| 2004/0032669 A1 | * | 2/2004 | Trotter, Jr. | 359/653 |

FOREIGN PATENT DOCUMENTS

| | | |
|---|---|---|
| EP | 1106586 | 6/2001 |
| WO | WO02/14233 | 2/2002 |
| WO | WO03/007027 | 1/2003 |

* cited by examiner

*Primary Examiner*—Akm Enayet Ullah
*Assistant Examiner*—Jerry T. Rahll
(74) *Attorney, Agent, or Firm*—Timothy M. Schacborle

(57) ABSTRACT

A collimator for use at multiple wavelengths includes an optical fiber and a gradient index lens positioned at a constant distance with respect to an end of the optical fiber. The gradient index lens has a chromatic aberration at a selected pitch less than 0.01 over a selected range of the infrared spectral region.

17 Claims, 5 Drawing Sheets

------- 980 nm
——— 1550 nm

♦ Lens A
◇ Lens B (Prior Art)

MULTI-BANDWIDTH COLLIMATOR

CROSS REFERENCES TO RELATED APPLICATIONS

This application claims the benefit of U.S. Provisional Application Ser. No. 60/465,830, filed Apr. 25, 2003.

BACKGROUND OF THE INVENTION

The assembly of a fiber end with a lens for producing a substantially parallel beam from light emerging from the fiber end is called a "collimator." The lens could be a gradient index (GRIN), refractive, or diffractive lens. Herein, the focus is on a collimator incorporating a GRIN lens. The GRIN lens has an index of refraction that gradually varies from the axis of the lens towards the outer periphery of the lens. In a GRIN lens, rays of light follow sinusoidal paths whose trajectory is defined in terms of pitch. One pitch is equivalent to the light traversing one sinusoidal cycle and can be expressed as follows:

$$P = \frac{L\sqrt{A}}{2\pi} \quad (1)$$

where P is pitch, $\overline{A}$ is index gradient parameter, and L is length of the lens.

The collimator is assembled by placing the fiber end a distance from the lens. The fiber-to-lens distance is determined by the back focal length (BFL) of the GRIN lens, which can be expressed as follows:

$$BFL = \frac{1}{N_o\sqrt{A}}\cot(L\sqrt{A}) \quad (2)$$

where $n_o$ is on-axis index of refraction of the lens, $\overline{A}$ is index gradient parameter, and L is length of the lens. Both $N_o$ and $\overline{A}$ are functions of wavelength. The dependence of $N_o$ on wavelength can be expressed as follows:

$$N_o = B + \frac{C}{\lambda^2} \quad (3)$$

where B and C are constants depending on the lens material. The dependence of $\overline{A}$ on wavelength can be expressed as follows:

$$A(\lambda) = \left[K_0 + \frac{K_1}{\lambda^2} + \frac{K_2}{\lambda^4}\right]^2 \quad (4)$$

where $K_0$, $K_1$, and $K_2$ are constants depending on the lens material.

Ideally, the fiber-to-lens distance is such that the collimator operates with low insertion loss. It is common practice to tune the collimator to operate efficiently at a particular design wavelength. However, the BFL of the GRIN lens varies from one wavelength to another due to chromatic dispersion. Thus, if a collimator tuned to operate efficiently at a particular design wavelength is used at a wavelength other than the design wavelength, there would be an offset in BFL. If the fiber-to-lens distance is not adjusted to compensate for this offset, the collimator could have excessive insertion loss, particularly if there is a great disparity between the design wavelength and the operating wavelength. As can be appreciated, the need to readjust the fiber-to-lens distance for each operating wavelength complicates use of the collimator in multi-bandwidth applications.

From the foregoing, a collimator that can operate efficiently at multiple wavelengths without having to readjust the fiber-to-lens distance at each wavelength is desired.

SUMMARY OF THE INVENTION

The invention relates to a collimator for use at multiple wavelengths. In one embodiment, the collimator comprises an optical fiber and a gradient index lens positioned at a constant distance with respect to an end of the optical fiber. In one aspect, the gradient index lens has a chromatic aberration at a selected pitch less than 0.01 over a selected range of the infrared spectral region. In another aspect, the gradient index lens has a chromatic aberration at a selected pitch less than 0.035 over a selected range of the visible spectral region.

Other features and advantages of the invention will be apparent from the following description and the appended claims.

DETAILED DESCRIPTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Embodiments of the invention provide a collimator having a GRIN lens positioned at an end of an optical fiber. The collimator can be tuned at a particular design wavelength and then operated efficiently over a wide range of wavelengths including the design wavelength without having to readjust the distance between the fiber end and the lens. The collimator is particularly intended for the infrared spectral region but may also be used in the near-infrared and visible spectral regions. The invention is based in part on the discovery that a GRIN lens having low chromatic aberration when incorporated in a collimator can enable the collimator to operate with a low insertion loss over a wide range of wavelengths without having to readjust the fiber-to-lens distance. Insertion loss less than 0.42 dB has been achieved over a wavelength range of 980 to 1550 nm.

Figure 1A:
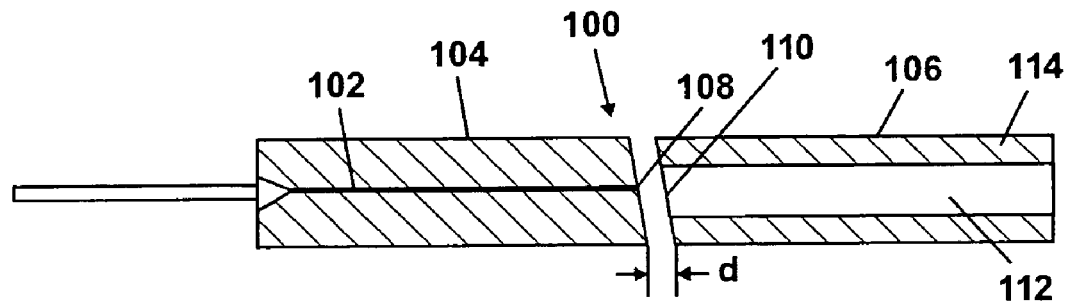
FIGS. 1A–1D illustrate various embodiments of a collimator incorporating a gradient index lens having reduced chromatic aberration according to the invention.
Figure 1B:
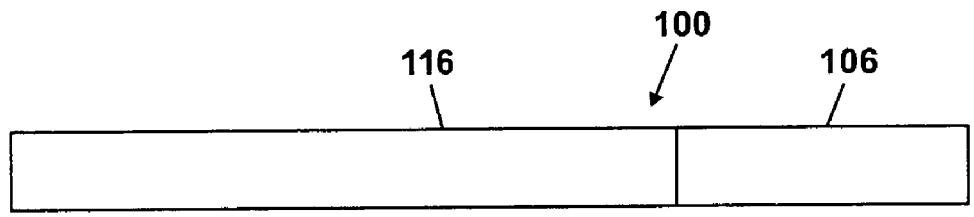
Figure 1C:
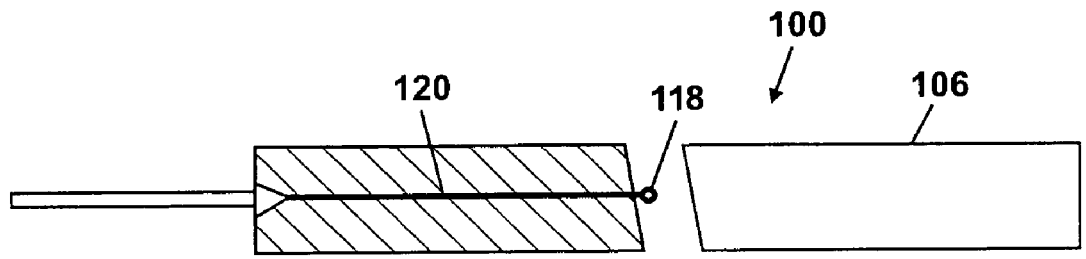
Figure 1D:
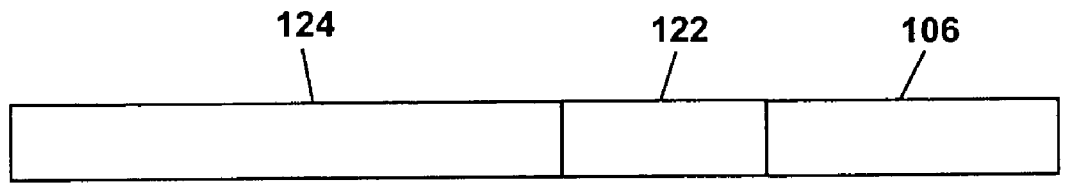

FIG. 1A shows a collimator 100 according to one embodiment of the invention. The collimator 100 includes a fiber 102 inserted in a ferrule 104 and a GRIN lens 106 positioned a distance from the fiber end 108. The distance (d) between the fiber end 108 and the surface 110 of the GRIN lens 106, i.e., the fiber-to-lens distance, is determined by the BFL of the GRIN lens 106, which is given by equation (2) above. In one embodiment, the fiber 102 is a single-mode fiber. Alternately, the fiber 102 may be a multimode fiber or other specialty fiber. FIGS. 1B–1D show alternate embodiments of the collimator 100. In FIG. 1B, a fiber 116 is fused to a GRIN lens 106, i.e., the fiber-to-lens distance is zero. In FIG. 1C, the collimator 100 includes a lens 118 formed at the end of a fiber 120, i.e., a lensed fiber, and the GRIN lens 106 positioned a distance from the lens 118. In FIG. 1D, the collimator 100 includes a coreless rod 122 interposed between a fiber 124 and a GRIN lens 106. The coreless rod 122 is made of fused silica or other suitable lens/fiber material.

Returning to FIG. 1A, the GRIN lens 106 has a core 112, which may or may not be bounded by a cladding 114. The core 112 of the GRIN lens 106 has a refractive index profile that increases radially toward the optical axis of the lens. In accordance with the invention, the GRIN lens 106 has a low chromatic aberration, which allows the collimator 100 to be used over a wide range of wavelengths without readjusting the fiber-to-lens distance (d). The chromatic aberration is typically defined as the change in the ratio of effective focal length between two wavelengths to the effective focal length at a C-line (wavelength 656 nm), F-line (wavelength 486 nm), and the D-line (wavelength 589 nm) corresponding to the Franunhoffer light. However, the principal application for the collimator is in the infrared spectral region, rather than the visible spectral region. Chromatic aberration for the infrared spectral region will be defined similarly to that for the visible spectral region, except that infrared wavelengths will used in the definition.

Figure 2A:
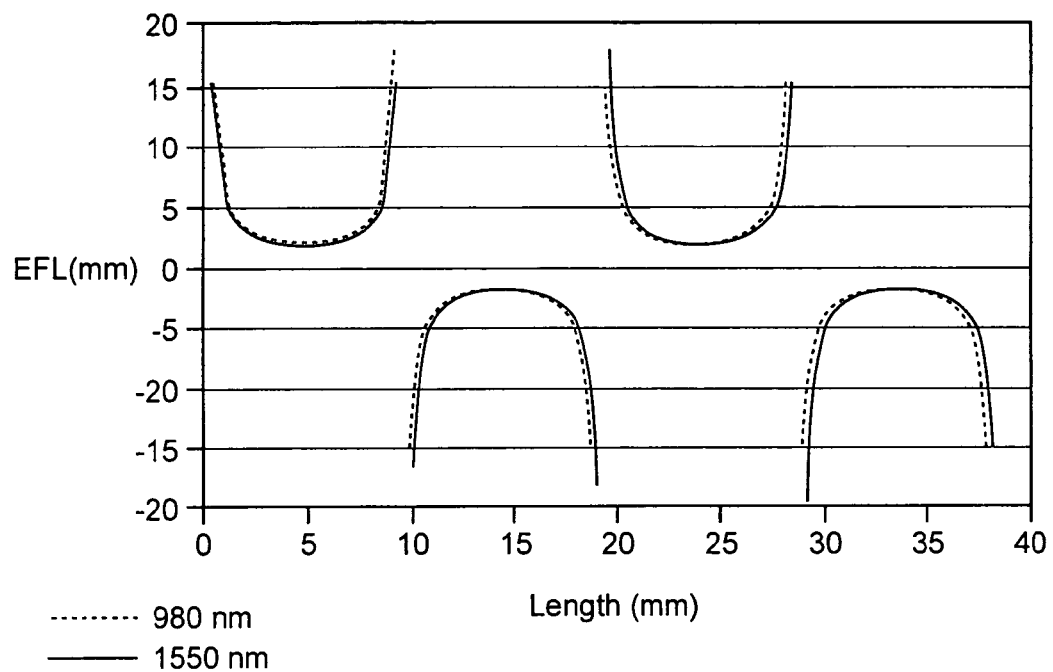
FIG. 2A shows effective focal length (EFL) as a function of length at 980 nm and 1550 nm for a GRIN lens according to an embodiment of the invention.
Figure 2B:
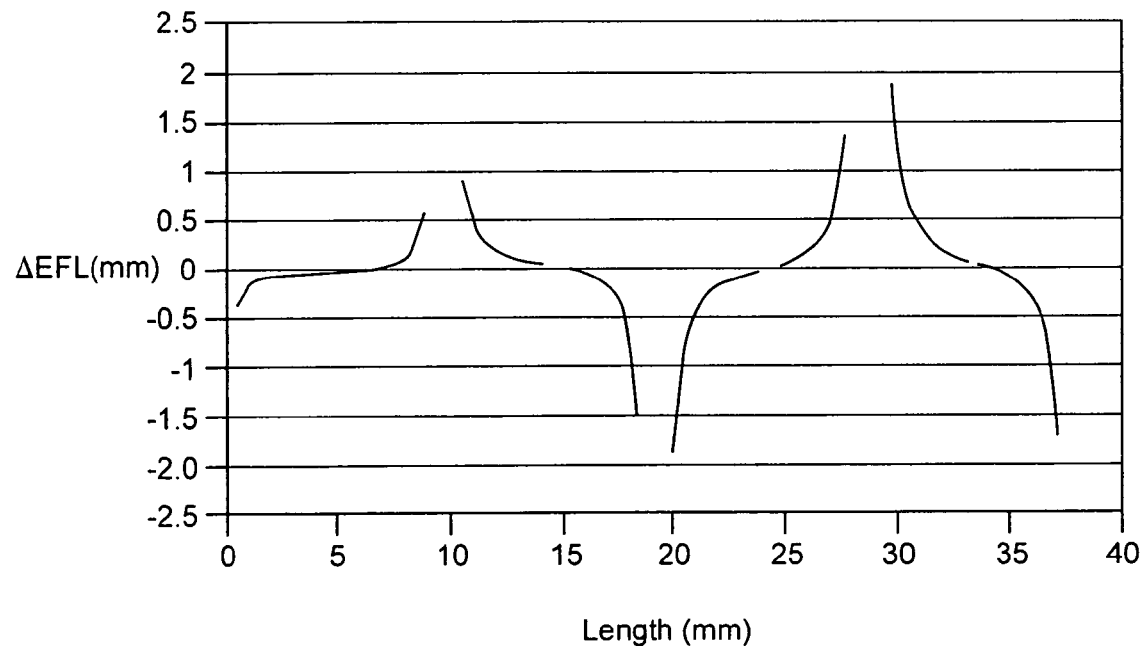
FIG. 2B shows difference in EFL (ΔEFL) as a function of length between 980 nm and 1550 nm for a GRIN lens according to an embodiment of the invention.

GRIN lenses have a radial refractive index distribution such that the refractive index gradually decreases from the central axis of the lens according to the following expression:

$$N = N_0\left(1 - \frac{A}{2}r^2\right) \quad (5)$$

where N is the refractive index at a distance r from the central axis, $N_0$ is the refractive index at the central axis, and A is a wavelength-dependent constant (see equation (4) for definition of A). The effective focal length (EFL) of the GRIN lens is given by the following expression:

$$EFL = \frac{1}{N_0\sqrt{A}\,\sin(L\sqrt{A})} \quad (6)$$

where L is the length of the lens. Since the constant A is dependent on wavelength, the lens will have different EFLs for different wavelengths. FIG. 2A shows EFL at 980 nm and 1550 nm for a GRIN lens according to an embodiment of the invention. FIG. 2B shows the difference in EFL ($\Delta$EFL) between 980 nm and 1550 nm. The EFL and $\Delta$EFL vary periodically as a function of length of lens. The difference is lowest at a length corresponding to a pitch of 0.25 and increases asymptotically to infinity at a length corresponding to pitch of 0.5, 1.0, 1.5, etc. Due to this dependence, the chromatic aberration must be specified at a specific pitch.

Figure 2C:
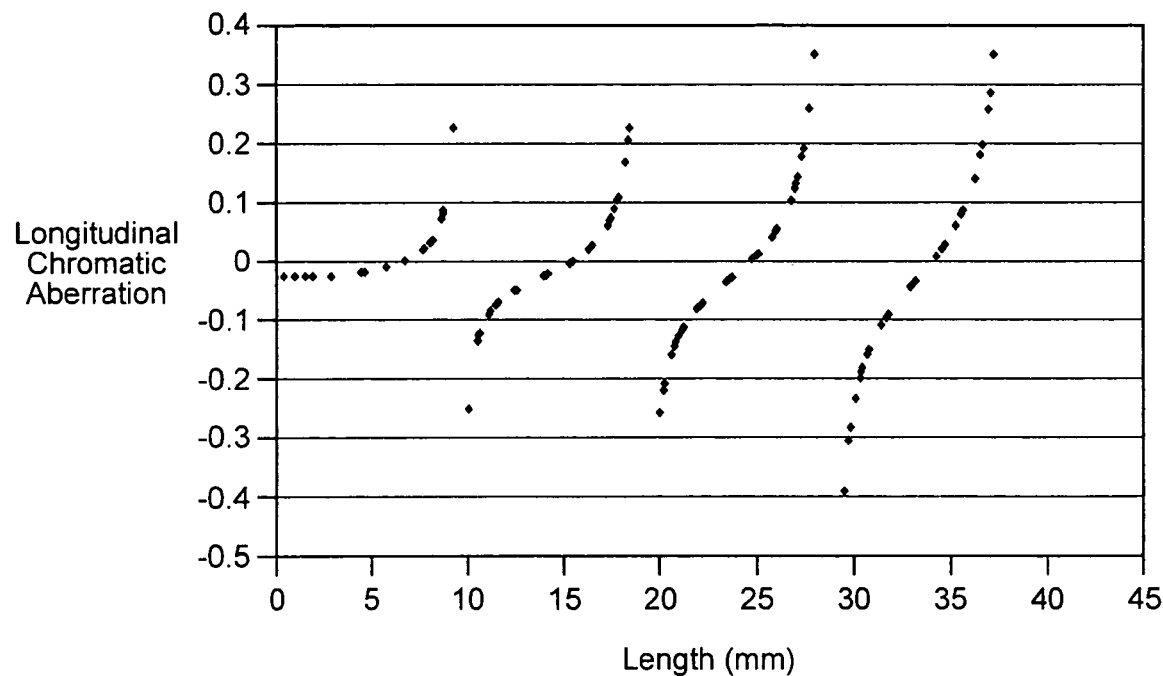
FIG. 2C shows that longitudinal chromatic aberration varies with length in a period manner.

Chromatic aberration is typically expressed as longitudinal or lateral chromatic aberration. The longitudinal chromatic aberration measures the inability of the light to focus different wavelengths of light at the same plane and is expressed mathematically as follows:

$$\text{Longitudinal Chromatic Aberration} = \frac{EFL_1 - EFL_2}{EFL_{1/2}} \quad (7)$$

where $EFL_1$ is effective focal length at a first wavelength, $EFL_2$ is effective focal length at a second wavelength, and $EFL_{1/2}$ is effective focal length at a wavelength between the first wavelength and the second wavelength. For the infrared spectral region, the first wavelength could be 1550 nm, the second wavelength could be 980 nm, and the wavelength between the first and second wavelength could be 1310 nm. These wavelengths are commonly used in telecommunications. Using these wavelengths in equation (7), FIG. 2C shows how longitudinal chromatic aberration varies as a function of length for a GRIN lens according to one embodiment of the invention.

The lateral chromatic aberration is the apparent when obliquely incident light results in sideways-displaced-focus, causing the wavelengths to separate. This can be expressed as:

$$\text{Lateral Chromatic Aberration} = \frac{(EFL - h)_1 - (EFL - h)_2}{(EFL - h)_{1/2}} \quad (8)$$

where h is the distance between the principal plane and the end plane of the lens and can be expressed as:

$$h = \frac{1}{N_0\sqrt{A}} \times \tan\left(\frac{L\sqrt{A}}{2}\right) \quad (9)$$

Figure 2D:
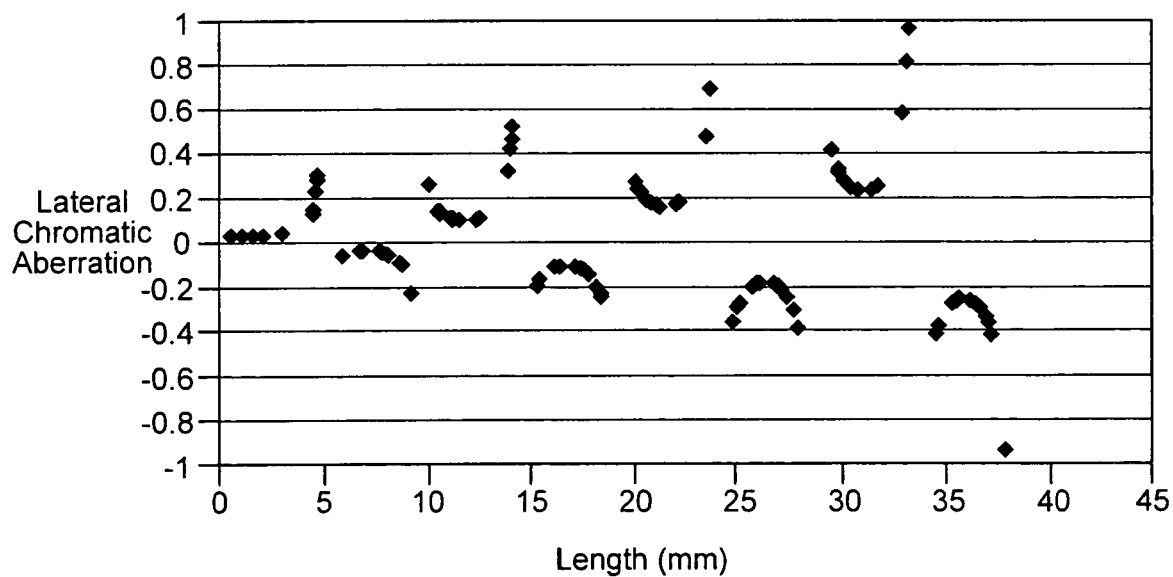
FIG. 2D shows that lateral chromatic aberration varies with length in a period manner.

Again, using the previous infrared wavelengths in equation (9), FIG. 2D shows how transverse chromatic aberration varies as a function of length for a GRIN lens according to an embodiment of the invention.

The longitudinal and lateral chromatic aberrations are due to wavelengths having different pitch lengths as they travel through the lens. This dependence on length can be removed by expressing EFL and h used in equations (7) and (8) as a function of pitch (P), rather than length, as shown below.

$$EFL = \frac{1}{N_0 \sqrt{A} \sin(2\pi P)} \quad (9)$$

$$h = \frac{1}{N_0 \sqrt{A}} \times \tan(\pi P) \quad (10)$$

If longitudinal and chromatic aberrations are expressed as functions of pitch, rather than length, they become equal and approach a constant value over a wavelength range. Table 1 below shows what this constant value would be for a GRIN Lens A according to an embodiment of the invention and a prior-art GRIN Lens B in the visible wavelength range (656/486 nm) and infrared wavelength range (1550/980 nm). Lens A is made from a borosilicate glass having a high silver content. Lens B is made from a thallium-based glass. As can be seen in Table 1, even though the chromatic aberration for Lens A and Lens B are somewhat comparable in the visible wavelength range, there is a substantial difference between the chromatic aberration of the two lenses in the infrared wavelength range. In accordance with one embodiment of the invention, a GRIN lens suitable for use in the collimator of the invention has a chromatic aberration less than 0.01 in the infrared spectral region, e.g., over a wavelength range of 980 nm to 1550 nm, and a chromatic aberration less than 0.035 in the visible wavelength range, e.g., over a wavelength range of 486 nm to 656 nm.

TABLE 1

|  | Chromatic Aberration (longitudinal/transverse) | |
|---|---|---|
|  | 1550/980 nm | 656/486 nm |
| Lens A | 0.0081 | 0.0334 |
| Lens B (Prior Art) | 0.0141 | 0.0484 |

The dependence of chromatic aberration on pitch (ΔP/P) can be defined as:

$$\frac{\Delta P}{P} = \frac{P_2 - P_1}{P_{1/2}} \quad (10)$$

where $P_1$ is pitch at a first wavelength, $P_2$ is pitch at a second wavelength, and $P_{1/2}$ is pitch at a wavelength between the first and second wavelength. For a wavelength range of 980 nm to 1550 nm, $P_1$ is pitch at 1550 nm, $P_2$ is pitch at 980 nm, and $P_{1/2}$ is pitch at 1310 nm. For a wavelength range of 486 nm to 656 nm, $P_1$ is pitch at 656 nm, $P_2$ is pitch at 486 mm, and $P_{1/2}$ is pitch at 587 nm. Table 2 compares ΔP/P for these wavelength ranges for the Lens A (according to one embodiment of the invention) and Lens B (prior art). Table 2 shows that Lens A has a lower ΔP/P compared to the prior-art Lens B. In accordance with one embodiment of the invention, a GRIN lens suitable for use in the collimator of the invention has ΔP/P less than 0.005 in the infrared spectral region, e.g., over a wavelength range of 980 nm to 1550 nm, and ΔP/P less than 0.025 in the visible wavelength range, e.g., over a wavelength range of 486 nm to 656 nm.

TABLE 2

|  | ΔP/P | |
|---|---|---|
|  | Lens A | Lens B |
| 656/486 nm | 0.0238 | 0.0396 |
| 1550/980 nm | 0.0048 | 0.0110 |

In one embodiment, the GRIN lens 106 having low chromatic aberration is made from a borosilicate glass having a high silver content. A glass batch having the following compositional ranges may be used for the GRIN lens: 15–60 wt % $SiO_2$, 10–30 wt % $Al_2O_3$, 30–50 wt % $Ag_2O$, and 10–45 wt % $B_2O_3$. The glass batch may include other optional ingredients. The higher the $Ag_2O$ content, the higher the refractive index of the GRIN lens. A glass batch having the following compositional ranges has delivered a GRIN lens with desirable results: 34.89 to 35.31 wt % $SiO_2$, 16.47 to 16.73 wt % $Al_2O_3$, 34.55 to 34.85 wt % $Ag_2O$, and 13.95 to 14.25 wt % $B_2O_3$. PCT Publication WO 02/14233 A1, the content of which is incorporated herein by reference, describes a method suitable for making borosilicate glass with high silver content.

Figure 3:
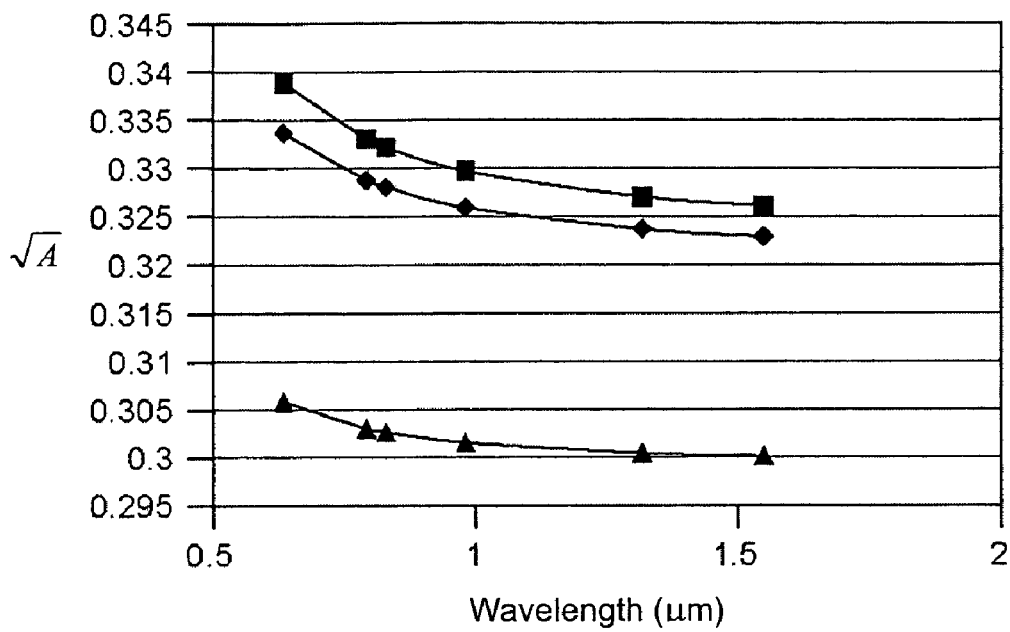
FIG. 3 is a graph showing the dependence of the index gradient parameter (= $\overline{A}$) versus wavelength for a lens according to the invention and prior art lenses.

BFL of a GRIN lens is a function of the index gradient parameter A, as shown in equation (2) above. FIG. 3 compares the variation in $= \overline{A}$ as a function of wavelength for Lens A, according to one embodiment of the invention, and prior art lenses B and C. Lens A is made from a glass batch having the following compositional ranges 34.89 to 35.31 wt % $SiO_2$, 16.47 to 16.73 wt % $Al_2O_3$, 34.55 to 34.85 wt % $Ag_2O$, and 13.95 to 14.25 wt % $B_2O_3$. Prior art lenses B and C are made from thallium-containing soda-lime glasses. Lenses A, B, and C have a focusing power of 1.8. From FIG. 3, it can be seen that $= \overline{A}$ varies to a lesser extent as a function of wavelength for Lens A than for prior-art Lens B, C. The dispersion constants B, C, $K_0$, $K_1$, and $K_2$ for Lens A and Lens B are shown in Table 3 below. Table 3 also shows $n_o$, $= \overline{A}$, $= \overline{A}$, and BFL at 1310 nm and 1550 nm for Lens A and prior art Lens B.

TABLE 3

|  | Lens B | | Lens A | |
|---|---|---|---|---|
| B | 1.5868 | | 1.534358 | |
| C | 0.00814 | | 0.0081549 | |
| $K_0$ | 0.3238 | | 0.2993061 | |
| $K_1$ | 0.005364 | | 0.0018621 | |
| $K_2$ | 0.0002626 | | 0.0002998 | |
| Wavelength (nm) | 1310 | 1550 | 1310 | 1550 |
| $n_o$ | 1.59154 | 1.59019 | 1.53911 | 1.53775 |
| $\sqrt{A}$ (mm$^{-1}$) | 0.32701 | 0.32608 | 0.30049 | 0.30013 |
| Pitch | 0.23066 | 0.23000 | 0.23028 | 0.23000 |
| Length (mm) | 4.4319 | 4.4319 | 4.8150 | 4.8150 |
| BFL (mm) | 0.2335 | 0.2423 | 0.2680 | 0.2723 |
| Δ BFL (mm) | 0.0089 | | 0.0043 | |

Suppose that a collimator incorporating prior-art Lens B is designed to operate efficiently at 1550 nm. This collimator would have a fiber-to-lens distance of 0.2423 mm and a lens pitch of 0.23. If this same collimator is used at 1310 nm, the length of the lens which produced 0.23 pitch at 1550 nm would now produce 0.23066 pitch at 1310 nm, as shown in Table 3. The BFL for 0.23066 pitch is 0.2335, which is different from BFL at 1550 nm by 8.9 μm. If a collimator incorporating Lens A, according to one embodiment of the invention, is designed to operate efficiently at 1550 nm, the fiber-to-lens distance for the collimator would be 0.2723 mm for 0.23 pitch. If this same collimator is used at 1310 nm, the length of the lens which produced 0.23 pitch at 1550 nm would now produce 0.23028 at 1310 nm, as shown in Table 3 above. The BFL for 0.23028 pitch is 0.2680, which is different from BFL at 1550 nm by 4.3 μm, which is less than half the BFL offset with the collimator incorporating the prior-art Lens B. This reduction in BFL offset suggests that Lens A has a lower chromatic aberration in comparison to prior-art Lens B.

Figure 4:
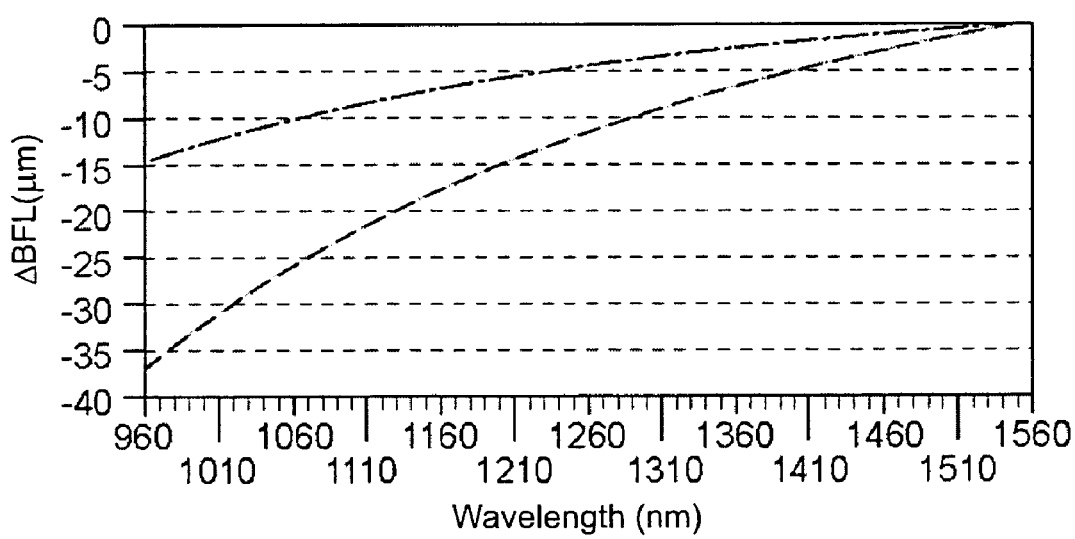
FIG. 4 is a graph showing variation in back focal length (BFL) over a wavelength range for a lens according to the invention and a prior art lens.

The performance of collimators incorporating Lens A, according to one embodiment of the invention, and prior-art Lens B was modeled using Zemax® ray-tracing program. FIG. 4 shows the differences in BFL at different wavelengths for a collimator designed to operate efficiently at 1550 nm. In such a system, there is a difference in BFL of 9.4 μm with the prior-art Lens B and 3.4 μm with Lens A at 1310 nm. This validates the calculations shown in Table 3 above and suggests that the differences in performance observed could be greater than what is shown in the above example. Table 4 below compares BFL of collimators incorporating Lens A and prior-art Lens B in various wavelength ranges with the model predictions. Within the error of measurement (~3 μm), the data shows that there is a measurable difference between BFL of a collimator incorporating Lens A and BFL of a collimator incorporating prior-art Lens B. In particular, Lens A results in a much smaller variation in BFL due to the low chromatic aberration of Lens A as compared to Lens B.

TABLE 4

| | | Wavelength (nm) | | |
|---|---|---|---|---|
| | | 1550–1310 | 1310–980 | 1550–980 |
| A | Zemax ® ΔBFL (μm) | 3 | 10 | 13 |
| A | Measured ΔBFL (μm) | 0 | 13 | 13 |
| B | Zemax ® ΔBFL (μm) | 8 | 22 | 34 |
| B | Measured ΔBFL (μm) | 7.5 | 22 | 30 |

Figure 5:
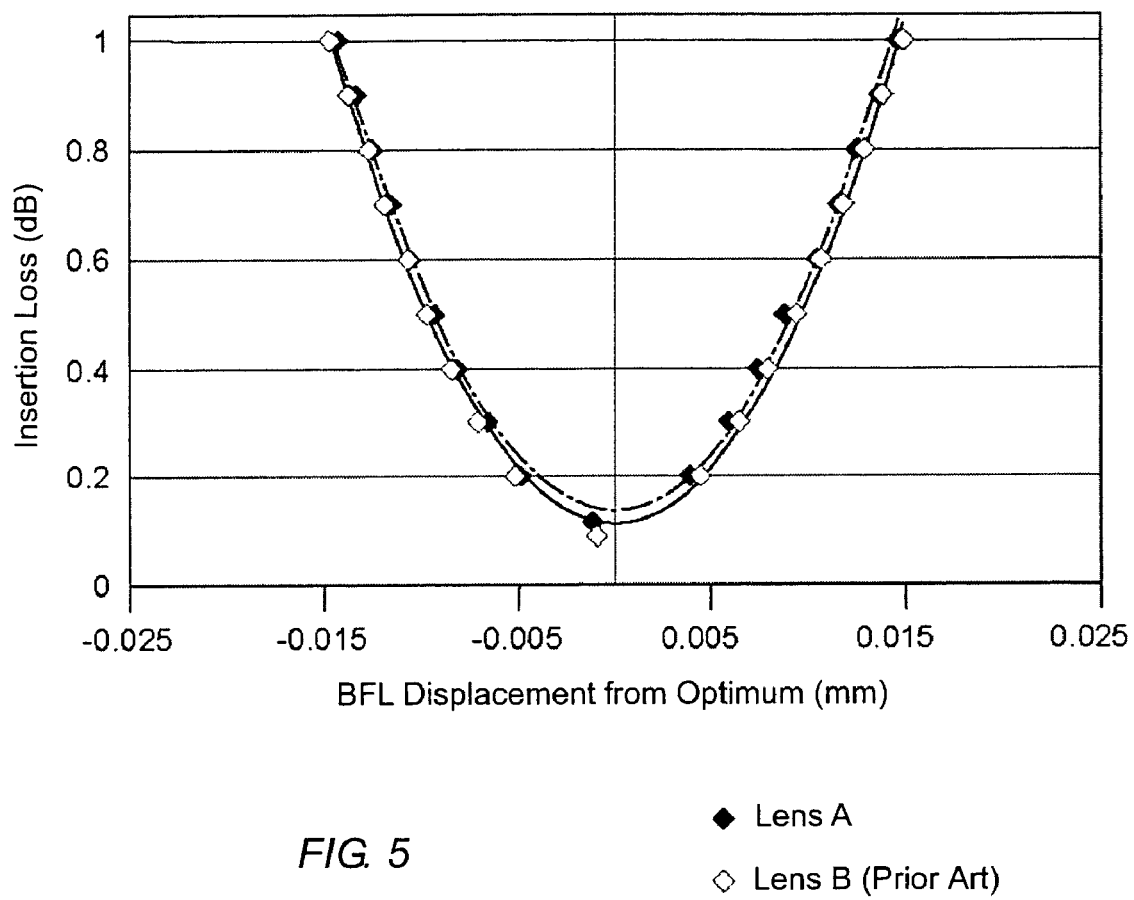
FIG. 5 is a graph showing measured insertion loss as a function of BFL offset from the optimum for a lens according to the invention and a prior art lens.

The performance of the collimator is very sensitive to differences in BFL. FIG. 5 shows the measured value of insertion loss compared to the offset in BFL from the optimum for Lens A and prior-art Lens B. In this example, the collimator is tuned at 1550 nm. An offset of 9 μm (Lens B) would cause an insertion loss greater than 0.4 dB, while an offset of 4.5 μm (Lens A) would induce less than 0.2 dB insertion loss. This is total insertion loss, which indicates that collimators using Lens A or lenses having chromatic aberration similar to Lens A will have less than 0.2 dB loss over the wavelength range of 1310 nm to 1550 nm. If the collimator is tuned at one end of the wavelength range, i.e., at 1310 nm or 1550 nm, the insertion loss at the other end will be 0.4 dB for the Lens A. If the collimator is tuned at the middle of the wavelength range, the insertion loss will be less than 0.2 dB over the aforementioned wavelength range. Calculations for the 0.25 pitch lens also indicate similar performance differences between the Lens A and prior-art Lens B.

FIG. 4 also reveals that if the collimator incorporating Lens A is tuned at 1550 nm, then the misalignment of the fiber with respect to the lens will be less than 15 μm at 980 nm. If, however, this same collimator is tuned at the middle of the overall wavelength range of 980 to 1625 nm, i.e., at 1302 nm, then the misalignment would be half of 15 μm (or 7.5 μm) at both ends of the wavelength range (again 980 and 1625 nm). An examination of FIG. 5 shows that a misalignment of 7.5 μm would result in a collimator having a maximum insertion loss at either 980 or 1625 nm of approximately 0.38 dB, i.e., the collimator would exhibit an insertion loss of less than 0.42 dB over the entire 980 to 1625 nm range of operation.

A collimator built with a lens having high chromatic aberration, such as prior-art Lens B, may be optimized for 1550 nm, or for dual wavelength ranges, may be optimized for a wavelength in the middle of the range. For example for a wavelength range of 1310 nm to 1550 nm, the collimator could be optimized at 1430 nm. However, the collimator optimized at 1430 nm will have reduced performance at 1310 nm and 1550 nm. A collimator built with a lens having reduced chromatic aberration, such as Lens A, according to the present invention, can be optimized at the middle of a wavelength range, e.g., at 1430 nm, and this design would work efficiently at 1430 nm and at the ends of the wavelength range, e.g., at 1310 nm and 1550 nm.

The reduced chromatic aberration of the lens according to the present invention is advantageous in making a collimator for dual band applications at 1310 and 1550 nm, as well as multi-bandwidth applications at 980 to 1625 nm. The low chromatic aberration of the lens results in reduced variation in BFL of the lens from the optimum position over a wavelength range, which results in improved performance, e.g., lower insertion loss, of the collimator over the wavelength range. Because the collimator according to the present invention can be used over multiple wavelengths, there is reduced inventory levels and improved stock keeping unit management through stocking one product versus two or more for those products operating at both 1310 nm and 1550 nm or multiple bandwidths over the entire wavelength range of 980–1625 nm.

It will be apparent to those skilled in the art that various modifications and variations can be made to the present invention without departing from the spirit or scope of the invention. For example, although the figures show the optical performance of lenses at 1310 nm and 1550 nm wavelengths, it will be understood that the invention is not limited to a particular operating wavelength and other wavelengths are within the scope of the invention. Thus, it is intended that the present invention covers modifications and variations of this invention provided they come within the scope of the appended claims and their equivalents.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A collimator for use at multiple wavelengths, comprising:
   an optical fiber; and
   a gradient index lens positioned at a constant distance with respect to an end of the optical fiber, the gradient index lens having a chromatic aberration at a selected pitch less than 0.01 over a selected range of the infrared spectral region.

2. The collimator of claim 1, wherein the gradient index lens has a change in pitch less than 0.005 over the selected range of the infrared spectral region.

3. The collimator of claim 2, wherein the selected range of the infrared spectral region is 980 to 1550 nm.

4. The collimator of claim 1, wherein the gradient lens has a chromatic aberration at a selected pitch less than 0.035 over a selected range of the visible spectral region.

5. The collimator of claim 4, wherein the gradient index lens has a change in pitch less than 0.025 over the selected range of the visible spectral region.

6. The collimator of claim 5, wherein the selected range of the visible spectral region is 486 to 656 nm.

7. The collimator of claim 1, wherein the gradient index lens comprises silver.

8. The collimator of claim 1, wherein the gradient index lens comprises 30–50 wt % $Ag_2O$.

9. The collimator of claim 1 having an insertion loss less than approximately 0.42 dB over a wavelength range of 980 nm to 1550 nm.

10. The collimator of claim 1 having an insertion loss less than approximately 0.2 dB over a wavelength range of 1310 nm to 1550 nm.

11. The collimator of claim 1, wherein a lens is formed at the end of the optical fiber, and the gradient index lens is positioned a constant distance with respect to the lens formed at the end of the optical fiber.

12. The collimator of claim 1, further comprising a coreless rod interposed between the end of the optical fiber and the gradient index lens.

13. A collimator for use at multiple wavelengths, comprising:
   an optical fiber; and
   a gradient index lens positioned at a constant distance with respect to an end of the optical fiber, the gradient index lens having a chromatic aberration at a selected pitch less than 0.035 over a selected range of the visible spectral region.

14. The collimator of claim 13, wherein the gradient index lens has a change in pitch less than 0.025 over the selected range of the visible spectral region.

15. The collimator of claim 14, wherein the selected range of the visible spectral region is 486 to 656 nm.

16. The collimator of claim 13, wherein the gradient index lens comprises silver.

17. The collimator of claim 13, wherein the gradient index lens comprises 30–50 wt % $Ag_2O$.

* * * * *